United States Patent
Ryu

(10) Patent No.: US 7,538,496 B2
(45) Date of Patent: May 26, 2009

(54) DISPLAY APPARATUS

(75) Inventor: Kwang-choon Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 11/469,593

(22) Filed: Sep. 1, 2006

(65) Prior Publication Data

US 2007/0052372 A1    Mar. 8, 2007

(30) Foreign Application Priority Data

Sep. 7, 2005    (KR) .................... 10-2005-0083131

(51) Int. Cl.
G09G 3/10    (2006.01)
G09G 3/36    (2006.01)

(52) U.S. Cl. .................... 315/169.3; 315/291; 345/102; 345/211

(58) Field of Classification Search ............. 315/209 R, 315/224, 291, 307, 169.1–169.3, 225, 226, 315/241 R; 345/87, 211–213, 60, 76; 363/97
See application file for complete search history.

(56) References Cited

U.S. PATENT DOCUMENTS

| | | | | |
|---|---|---|---|---|
| 5,745,092 | A * | 4/1998 | Ito ................... | 345/95 |
| 6,239,558 | B1 * | 5/2001 | Fujimura et al. ........... | 315/307 |
| 6,476,638 | B1 | 11/2002 | Zhou et al. | |
| 6,690,591 | B2 * | 2/2004 | Min ................... | 363/97 |
| 7,019,728 | B2 * | 3/2006 | Lee et al. ................... | 345/98 |
| 7,196,679 | B2 * | 3/2007 | Jang et al. ................... | 345/60 |
| 2001/0022584 | A1 * | 9/2001 | Tsugawa ................... | 345/211 |
| 2003/0169604 | A1 * | 9/2003 | Min ................... | 363/25 |
| 2004/0012987 | A1 * | 1/2004 | Hachisuka et al. ............ | 363/95 |
| 2005/0087671 | A1 * | 4/2005 | Park ................... | 250/205 |
| 2005/0151424 | A1 * | 7/2005 | Hirosue ................... | 307/11 |
| 2006/0284577 | A1 * | 12/2006 | Shin et al. ................... | 315/360 |

FOREIGN PATENT DOCUMENTS

| | | |
|---|---|---|
| EP | 1524648 | 4/2005 |
| JP | 06-85179 | 3/1994 |
| KR | 1993-22503 | 10/1993 |
| KR | 2004-101654 | 12/2004 |

OTHER PUBLICATIONS

Korean Office Action dated Nov. 1, 2006 issued in KR 2005-83131.

* cited by examiner

*Primary Examiner*—Douglas W Owens
*Assistant Examiner*—Jimmy T Vu
(74) *Attorney, Agent, or Firm*—Stanzione & Kim, LLP

(57) ABSTRACT

A display apparatus including a display panel to display an image and a back light illuminating the display panel, including an inverter to supply a driving power to the back light, a power supply to supply power to the inverter, a microcomputer to output a back light control signal to control an illuminating function of the back light, a controller to output an inverter control signal to the inverter according to a comparative result comparing an inverter power voltage supplied to the inverter with a predetermined reference voltage when the illuminating function of the back light is in a turned-on state based on the back light control signal.

15 Claims, 3 Drawing Sheets

DISPLAY APPARATUS

CROSS-REFERENCE TO RELATED APPLICATIONS

This application claims the benefit of Korean Patent Application No. 2005-0083131, filed on Sep. 7, 2005, in the Korean Intellectual Property Office, which is hereby incorporated herein in its entirety by reference.

BACKGROUND OF THE INVENTION

1. Field of the Invention

The present general inventive concept relates to a display apparatus, and more particularly, to a display apparatus capable of effectively preventing an inverter from maintaining a latch-up state when an instant power supplying error occurs.

2. Description of the Related Art

A cathode ray tube (CRT) has been mainly used as a display apparatus conventionally. However, the CRT has many problems such as having a heavy weight, a large thickness and a large amount of power consumption. Accordingly, the CRT has been recently substituted with a display apparatus such as a liquid crystal display (LCD), which adjusts the light transmittance for a display panel to display an image.

A brief control operation of the conventional display apparatus will be described while referring to FIG. 1. As illustrated in FIG. 1, the conventional display apparatus comprises a main board 3 processing an inputted image signal, a display unit 10 comprising a display panel 5 displaying an image according to the image signal processed by the main board 3, a back light 4 illuminating the display panel 5 and a panel driver 6 driving the display panel 5 to display the image, an inverter 2 supplying driving power to the back light 4, and a power supply 1 outputting power to the inverter 2 and the main board 3.

In the conventional display apparatus comprising the inverter 2, if an inverter power voltage Vin supplied from the power supply 1 is less than a predetermined reference voltage, an operation of the inverter 2 is automatically stopped. In other words, if the inverter power voltage Vin supplied from the power supply 1 is less than the predetermined reference voltage according to an instant error in supplying the power due to an unstable state of the power supply 1 or an instant turning-off of the power supplied from the power supply 1, the inverter 2 performs an under voltage protection function and thus becomes a latch-up state to stop the operation for itself.

On the other hand, although the inverter power voltage Vin is less than the predetermined reference voltage due to the instant error in supplying the power, the main board 3 capable of being operated by relative low power is normally operated in general.

Accordingly, in the conventional display apparatus, the main board 3 is normally operated and the inverter 2 becomes the latch-up state when the instant error in supplying the power has occurred. Although the normal power is supplied again after the instant error in supplying the power is corrected, the latch-up state of the inverter 2 is maintained so that the image is not displayed.

SUMMARY OF THE INVENTION

The present general inventive concept provides a display apparatus capable of effectively preventing an inverter from maintaining a latch-up state when an instant error in supplying power occurs.

Additional aspects and advantages of the present general inventive concept will be set forth in part in the description which follows and, in part, will be obvious from the description, or may be learned by practice of the general inventive concept.

Additional features of the invention will be set forth in the description which follows, and in part will be apparent from the description, or may be learned by practice of the invention.

The foregoing and/or other aspects and utilities of the present general inventive concept can be achieved by providing a display apparatus including a display panel to display an image and a back light illuminating the display panel, comprising: an inverter to supply driving power to the back light; a power supply to supply power to the inverter; a microcomputer to output a back light control signal to control an illuminating function of the back light; a controller to output an inverter control signal to the inverter according to a comparative result comparing an inverter power voltage supplied to the inverter with a predetermined reference voltage when the illuminating function of the back light is in a turned-on state based on the back light control signal.

If the inverter power voltage is more than the reference voltage, the controller can output the inverter control signal having a high level to the inverter, and if the inverter power voltage is less than the reference voltage, the controller can output the inverter control signal having a low level to the inverter, when the illuminating function of the back light is the turned-on state based on the back light control signal.

The controller can comprise a comparator to output a comparative signal comparing the inverter power voltage with the reference voltage, and a switching unit to output the comparative signal as the inverter control signal according to the comparative result when the illuminating function of the back light is the turned-on state based on the back light control signal.

The inverter can perform an under voltage protection function and can become a latch-up state by the under voltage protection function if the inverter power source voltage is less than the reference voltage, and the reference voltage can be an inverter latch-up voltage which causes the inverter to become the latch-up state.

The microcomputer can output one of the back light control signal having the low level to turn-on the illuminating function of the back light and the back light control signal having the high level to turn-off the illuminating function of the back light.

The comparator can compare the inverter power voltage with the reference voltage, and can output the high signal if the inverter power voltage is more than the reference voltage and can output the low signal if the inverter power voltage is less than the reference voltage.

The switching unit is turned-on/off by the back light control signal outputted from the microcomputer, and outputs the comparative signal from the comparator as the inverter control signal if the switching unit is switched-off by inputting the back light control signal having the low level, and doesn't output the comparative signal input from the comparator to the inverter and outputs a predetermined low signal to the inverter if the switching unit is switched-on by inputting the back light control signal having the high level.

The switching unit can comprise a transistor comprising an grounded emitter, a base to receive the back light control signal output from the microcomputer and a collector to receive a predetermined supply power, a predetermined ground resistor provided on a collector signal line to transfer the supply power to the collector, and a united point on which to unite a comparative signal line output from the comparator into the collector signal line between the ground resistor and the collector, and a signal of the united point is output to the inverter.

The inverter can be enabled if the high signal is input from the controller and can be disabled if the low signal is input from the controller.

It is to be understood that both the foregoing general description and the following detailed description are exemplary and explanatory and are intended to provide further explanation of the invention as claimed.

The foregoing and/or other aspects and utilities of the present general inventive concept can be achieved by providing a control system used with a display apparatus having a back light and a display panel to display an image, comprising an inverter to supply a driving power to the back light based on an input power supplied thereto, a microcomputer to output a back light control signal to control an illuminating function of the back light, and a controller to generate an inverter control signal to be supplied to the inverter to control the supplying of the driving power based on a level of the input power supplied to the inverter when the illuminating function of the back light is in a turned-on state based on the back light control signal.

The level of the input power can be determined by comparing the input power supplied with a reference voltage.

The controller can comprise a comparator to compare the input power with the reference voltage to generate the inverter control signal, and a switching part to output the inverter control signal to the inverter based on the back light control signal received from the microcomputer.

The foregoing and/or other aspects and utilities of the present general inventive concept can be achieved by providing a latch-up relief circuit to relieve a latch-up state of an inverter used to supply power to a backlight of a display, comprising a comparator to compare a current input power supply voltage of the inverter with a reference voltage and to generate an inverter control signal to control the inverter state based on a result of the comparison; and a switching part to output the inverter control signal to the inverter to control the state of the inverter according to a backlight control signal received.

The switching part can be switched between an on and an off state by the backlight control signal.

The foregoing and/or other aspects and utilities of the present general inventive concept can be achieved by providing a method of controlling a state of an inverter used to supply power to a backlight of a display unit, the method comprising comparing a current input power supply voltage of the inverter with a reference voltage and generating an inverter control signal to control the inverter state based on a result of the comparison and controlling the state of the inverter via the inverter control signal based on an input backlight control signal.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
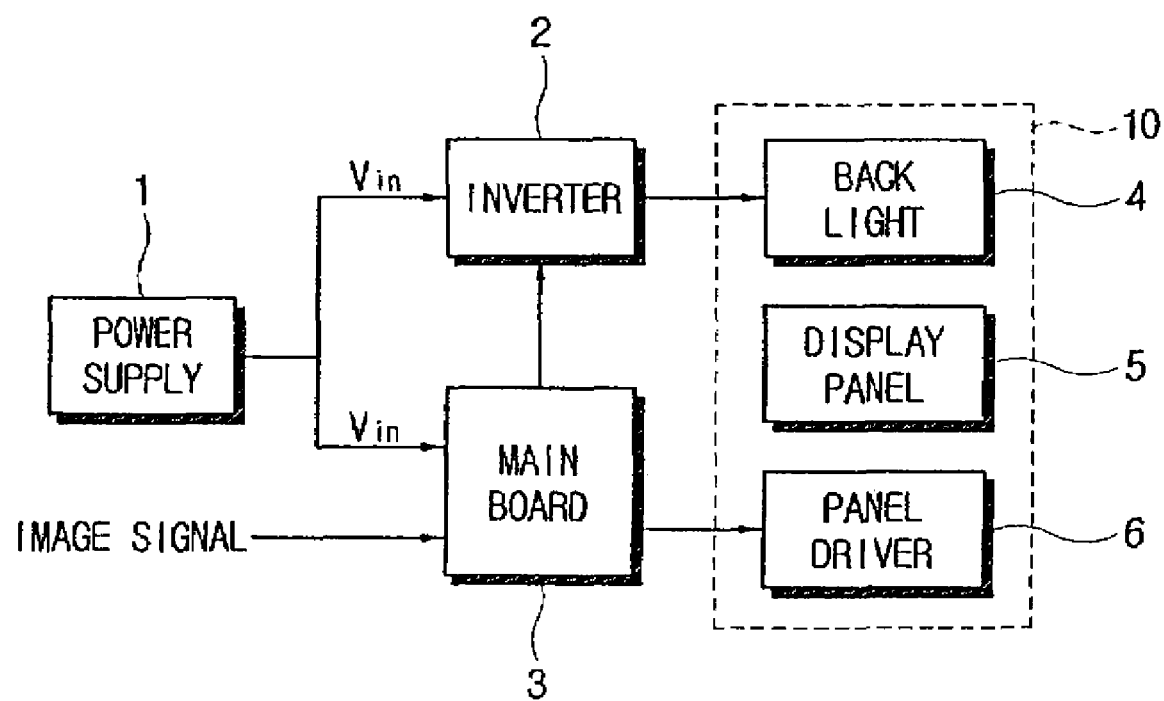
FIG. 1 is a control block diagram of a conventional display apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
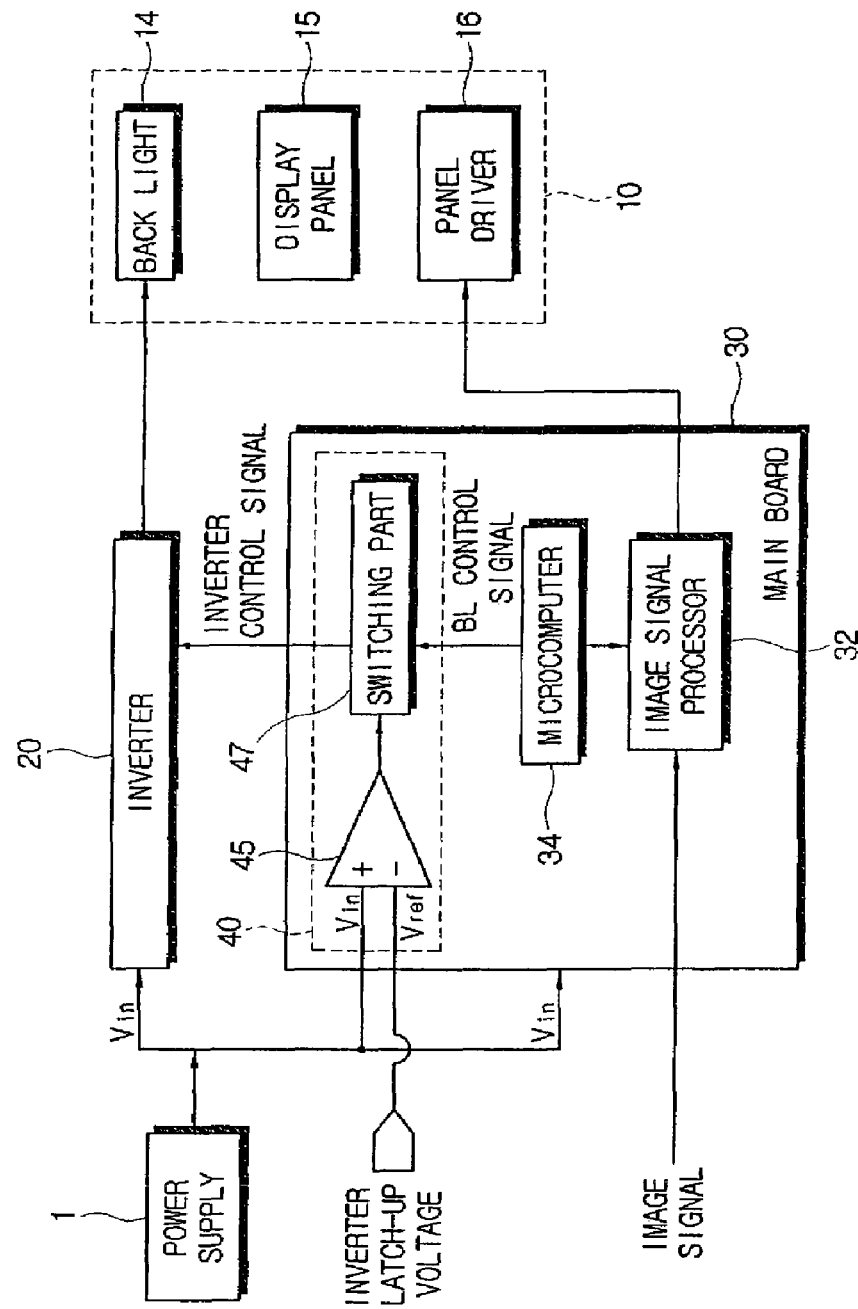
FIG. 2 is a control block diagram of a display apparatus according to an embodiment of the present general inventive concept.

FIG. 2 is a control block diagram of a display apparatus according to an embodiment of the present general inventive concept. As illustrated in FIG. 2, the display apparatus according to the present embodiment comprises a power supply 1, a display unit 10, an inverter 20, a main board 30, and a controller 40.

The power supply 1 converts power of an external adapter (not illustrated) in the display apparatus or power of an internal battery (not illustrated) in the display apparatus into power capable of being used in the inverter 20 and the main board 30, and thus outputs the converted power. The power supply 1 can support a switching mode power supply (SMPS) method.

The display unit 10 receives an image signal from an image signal processor 32 of the main board 30 and displays an image. The display unit 10 can comprise a display panel 15 to display the image, a back light 14 as a light source to illuminate the display panel 15, and a panel driver 16 which processes the image signal inputted from the image signal processor 32 and displays the image on the display panel 15. In the present embodiment, the display panel 15 according to the display apparatus of FIG. 2 may be a liquid crystal display (LCD) panel. However, other types of the display panel comprising the light source to display the image may be used.

The display unit 10 may have a corresponding constitution according to each type of a display panel. For example, if the display panel 15 is configured as a digital light processing (DLP) module, the panel driver 16 may comprise an optical engine, etc.

The inverter 20 converts a direct current (DC) power supplied from the power supply 1 into an alternating current (AC) power so as to supply the DC power to the back light 14 according to an inverter control signal inputted from the main board 30. In other words, if a high signal as the inverter control signal is input to the inverter 20, the inverter 20 is operated in a normal mode and thus outputs the AC power to the back light 14. If a low signal as the inverter control signal is input to the inverter 20, the inverter 20 disables its operation.

The inverter 20 performs an under voltage protection function. If an inverter power voltage Vin supplied from the power supply 1 is less than a predetermined reference voltage Vref, the inverter 20 becomes a latch-up state by stopping a driving of itself by an under voltage protection function. The reference voltage Vref is a minimum voltage required to drive the inverter 20 in the normal mode. The reference voltage Vref hereinafter will refer to an inverter latch-up voltage.

The main board 30 may comprise the image signal processor 32 to process the image signal provided from outside so as to output the image signal to the display unit 10, a microcomputer 34 to control a function of the image signal processor 32 and to output a back light control signal so as to control an illuminating function of the back light 14, and the controller 40 to output the inverter control signal to the inverter 20 according to a comparison result of comparing the inverter power voltage Vin supplied to the inverter 20 with the inverter latch-up voltage Vref when the illuminating function of the back light 14 is turned-on based on the back light control signal.

The image signal processor 32 may comprise a scaler (not illustrated) to scale an input image signal and a signal converter (not illustrated) to convert the input image signal to an image signal capable of being processed by the scaler (not illustrated). The signal converter (not illustrated) may be provided as a transition minimized differential signaling (TMDS) receiver, an A/D converter (not illustrated), a video decoder (not illustrated), a tuner (not illustrated) and the like which are signal processing devices suitable for a type of the input image signal.

The microcomputer 34 outputs the back light control signal (referring to a BL control signal described below) to control the illuminating function of the back light 14. In other words, the microcomputer 34 can output the BL control signal having a low level so that the illuminating function of the back light 14 is turned-on. Alternatively, if a predetermined back light off event, such as an inputting of the off function key (not illustrated) of the back light 14 or an entry into a power saving mode and the like is input, the microcomputer 34 can output the BL control signal having a high level to turn-off the illuminating function of the back light 14.

In addition, the microcomputer 34 may control the image signal processor 32 to process the input image signal as a suitable format to provide to the display unit 10 according to a type of the input image signal.

If the inverter power source voltage Vin is greater than the inverter latch-up voltage Vref when the illuminating function of the back light 14 is turned-on, the controller 40 outputs the inverter control signal as having the high level based on the BL control signal. If the inverter power voltage Vin is less than the inverter latch-up voltage Vref, the controller 40 outputs the inverter control signal as having the low level based on the BL control signal.

The controller 40 can comprise a comparator 45 to output a comparative signal corresponding to a comparison between the inverter power voltage Vin and the inverter latch-up voltage Vref and a switching part 47 to output the comparative signal as the inverter control signal to the inverter 20 according to the comparative result when the illuminating function of the back light 14 is controlled by the microcomputer 34 to be turned on or off based on the BL control signal.

The comparator 45 compares the inverter power voltage Vin with the inverter latch-up voltage Vref. If the inverter power voltage Vin is greater than the inverter latch-up voltage Vref, the comparator 45 outputs the high signal. If the inverter power voltage Vin is less than the inverter latch-up voltage Vref, the comparator 45 outputs the low signal.

The switching part 47 is switched-on/off by the BL control signal output from the microcomputer 34. If the BL control signal having the low level to turn-on the illuminating function of the back light 14 is input to switch off the switching part 47, the switching part 47 outputs the comparative signal input from the comparator 45 as the inverter control signal to the inverter 20. If the BL control signal having the high level to turn-off the illuminating function of the back light 14 is input to switch on the switching part 47, the switching part 47 does not output the comparative signal input from the comparator 45 to the inverter 20, but outputs a predetermined low signal to the inverter 20.

As described above, a detailed circuit configuration of the controller 40 of FIG. 2 will be explained below with reference to FIG. 3.

Figure 3:
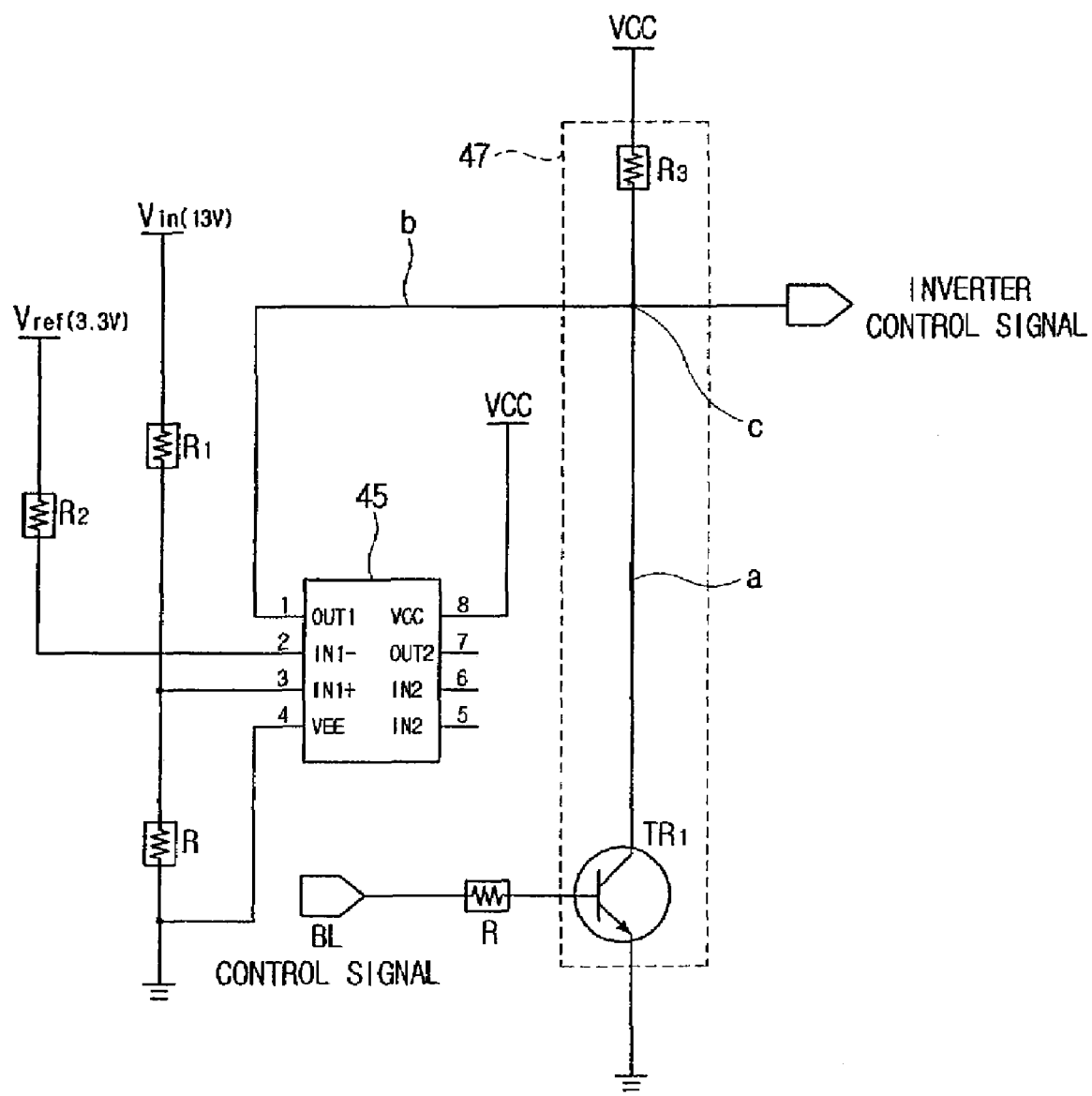
FIG. 3 is a detailed circuit configuration of the controller in the display apparatus of FIG. 2.

As illustrated in FIG. 3, the controller 40 comprises the comparator 45 to receive the inverter power voltage Vin (for example, 13V) and the inverter latch-up voltage (for example, 3.3V) Vref and to output the comparative signal corresponding to a comparison between the inverter power voltage Vin and the inverter latch-up voltage Vref to an OUT1 pin. Also, the controller 40 comprises the switching part 47. The switching part 47 can comprise a transistor TR1 comprising an emitter which is grounded, a base which receives the BL control signal output from the microcomputer 34, and a collector which receives a predetermined power VCC, a predetermined ground resistor R3 which is provided on a collector signal line and transfers the power VCC to the collector and a junction point c to connect a comparative signal line 'b' output from the comparator 45 to the collector signal line 'a' between the ground resistor R3 and the collector. A signal flowing along the junction point 'c' as the inverter control signal can be output to the inverter 20.

In the display apparatus of the present embodiment having the above configuration, an inverter control will be explained as follows.

While the BL control signal having the low level to turn-on the illuminating function of the back light 14 from the microcomputer 34 is input to the TR1, a switched-off state of the TR1 is maintained. The comparator 45 continuously outputs the comparative signal (the high signal/low signal according to the comparative result) corresponding to the comparison between the inverter power voltage Vin and the inverter latch-up voltage Vref. Accordingly, the comparative signal (the high signal/low signal according to the comparative result) as the inverter control signal output from the comparator 45 is directly output to the inverter 20 while an off-state of the TR1 is maintained. In other words, the inverter 20 is enabled if the comparative signal output from the comparator 45 is the high signal and the inverter 20 is disabled if the comparative signal is the low signal while the illuminating function of the back light 14 is controlled to be turned-on.

In the display apparatus according to the present embodiment, if an instant error occurs for supplying the power when the illuminating function of the back light 14 is turned-on, the inverter 20 becomes the latch-up state for itself as the inverter power voltage Vin is less than the inverter latch-up voltage Vref. At the same time, the comparator 45 of the controller 40 outputs the low signal. Accordingly, the inverter 20 becomes the latch-up state and the low signal as the inverter control signal is input to the inverter 20 at the same time.

After the instant error which occurred for supplying the power is corrected, the comparator 45 outputs the high signal as the inverter power voltage Vin is greater than the inverter latch-up voltage Vref. Thus, the high signal output from the comparator 45 as the inverter control signal is input to the inverter 20. Accordingly, the inverter 20 recognizes that the inverter control signal, which has been the low signal in the latch-up state, is converted to the high signal to be input therein as a reset and switches from the latch-up state and becomes the enable state in which the inverter 20 is operated in the normal mode once again.

Accordingly, a conventional problem in which an inverter becomes a latch-up state when an error for supplying power has occurred and then does not switch back from the latch-up state for itself in spite of a normal supplying of the power, so that the image continues not to be displayed, can be effectively corrected.

Also, while a BL control signal having a high level so as to turn-off an illuminating function of a back light from a microcomputer is input to a transistor, a switched-on state of the transistor can be maintained. Accordingly, a predetermined grounded low signal as an inverter control signal can be output to an inverter regardless of a comparative signal output from a comparator. Accordingly, the display apparatus of the present general inventive concept can disable an operation of an inverter in order to turn-off an illuminating function of a back light.

As the described above, the display apparatus according to the present invention is capable of effectively preventing an error of displaying an image according to maintaining the latch-up state of the inverter 20 when the instant error for providing the power is occurred.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus including a display panel to display an image and a back light to illuminate the display panel, comprising:

an inverter to supply a driving power to the back light;

a power supply to supply power to the inverter;

a microcomputer to output a back light control signal to control an illuminating function of the back light; and a controller to receive the back light control signal from the microcomputer and to output an inverter control signal to the inverter according to a comparative result of comparing an inverter power voltage supplied to the inverter with a predetermined reference voltage when the illuminating function of the back light is in a turned-on state based on the back light control signal.

2. The display apparatus according to claim 1, wherein if the inverter power voltage is more than the reference voltage, the controller outputs the inverter control signal having a high level to the inverter, and if the inverter power voltage is less than the reference voltage, the controller outputs the inverter control signal having a low level to the inverter, when the illuminating function of the back light is in the turned-on state based on the back light control signal.

3. The display apparatus according to claim 2, wherein the controller comprises a comparator to output a comparative signal comparing the inverter power voltage with the reference voltage, and a switching unit to output the comparative signal as the inverter control signal according to the comparative result when the illuminating function of the back light is in the turned-on state based on the back light control signal.

4. The display apparatus according to claim 3, wherein the inverter performs an under voltage protection function and becomes a latch-up state by the under voltage protection function if the inverter power source voltage is less than the reference voltage, and the reference voltage is an inverter latch-up voltage which causes the inverter to become the latch-up state.

5. The display apparatus according to claim 4, wherein the microcomputer outputs one of the back light control signal having the low level to turn-on the illuminating function of the back light and the back light control signal having the high level to turn-off the illuminating function of the back light.

6. The display apparatus according to claim 5, wherein the comparator compares the inverter power voltage with the reference voltage, and outputs the high signal if the inverter power voltage is greater than the reference voltage and outputs the low signal if the inverter power voltage is less than the reference voltage.

7. The display apparatus according to claim 6, wherein the switching unit is turned-on/off by the back light control signal output from the microcomputer, and outputs the comparative signal from the comparator as the inverter control signal if the witching unit is switched-off by inputting the back light control signal having the low level, and does not output the comparative signal input from the comparator to the inverter and output a predetermined low signal to the inverter if the switching unit is switched-on by inputting the back light control signal having the high level.

8. The display apparatus according to claim 7, wherein the switching unit comprises a transistor comprising an grounded emitter, a base receiving the back light control signal output from the microcomputer and a collector receiving a predetermined supply power, a predetermined ground resistor provided on a collector signal line transferring the supply power to the collector, and a junction point which joins a comparative signal line output from the comparator into the collector signal line between the ground resistor and the collector, and a signal of the junction point is output to the inverter.

9. The display apparatus according to claim 8, wherein the inverter is enabled if the high signal is input from the controller and is disabled if the low signal is input from the controller.

10. A control system used with a display apparatus having a back light and a display panel to display an image, comprising:

an inverter to supply a driving power to the back light based on an input power supplied thereto;

a microcomputer to output a back light control signal to control an illuminating function of the back light; and a controller to receive the back light control signal from the microcomputer and to generate an inverter control signal to be supplied to the inverter to control the supplying of the driving power based on a level of the input power supplied to the inverter when the illuminating function of the back light is in a turned-on state based on the back light control signal.

11. The control system according to claim 10, wherein the level of the input power is determined by comparing the input power supplied with a reference voltage.

12. The control system according to claim 11, wherein the controller comprises:

a comparator to compare the input power with the reference voltage to generate the inverter control signal; and a switching part to output the inverter control signal to the inverter based on the back light control signal received from the microcomputer.

13. A latch-up relief circuit to relieve a latch-up state of an inverter used to supply power to a backlight of a display, comprising:

a comparator to compare a current input power supply voltage of the inverter with a reference voltage and to generate an inverter control signal to control the inverter state based on a result of the comparison when the illuminating function of the back light is in a turned-on state; and a switching part to output the inverter control signal to the inverter to control the state of the inverter according to a backlight control signal received.

14. The latch-up relief circuit according to claim 13, wherein the switching part is switched between an on and an off state by the backlight control signal.

15. A method of controlling a state of an inverter used to supply power to a backlight of a display unit, the method comprising:

comparing a current input power supply voltage of the inverter with a reference voltage and generating an inverter control signal to control the inverter state based on a result of the comparison when the illuminating function of the back light is in a turned-on state; and controlling the state of the inverter via the inverter control signal based on an input backlight control signal.

* * * * *